United States Patent
Joo

(10) Patent No.: US 8,947,462 B2
(45) Date of Patent: Feb. 3, 2015

(54) APPARATUS AND METHOD FOR CHANGING USER INTERFACE OF PORTABLE TERMINAL

(75) Inventor: Sang-Woo Joo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 147 days.

(21) Appl. No.: 13/418,939

(22) Filed: Mar. 13, 2012

(65) Prior Publication Data

US 2013/0050270 A1 Feb. 28, 2013

(30) Foreign Application Priority Data

Aug. 30, 2011 (KR) .......................... 10-2011-0087318

(51) Int. Cl.
*G09G 5/00* (2006.01)
*G09G 3/20* (2006.01)

(52) U.S. Cl.
CPC .......... *G09G 3/20* (2013.01); *G09G 2340/0407* (2013.01)
USPC ........................ 345/661; 345/173; 361/679.27

(58) Field of Classification Search
CPC ............... G06F 3/00; G06F 3/01; G06F 3/14; G06F 3/147; G09G 3/20; G09G 5/00; G09G 5/003
USPC ........... 345/30, 619, 660, 661, 901, 903, 173; 715/733, 745, 773, 788, 815; 361/679.27
See application file for complete search history.

(56) References Cited

U.S. PATENT DOCUMENTS

| 2003/0071832 | A1 | 4/2003 | Branson |
| 2007/0279315 | A1* | 12/2007 | Laves et al. .................... 345/1.1 |
| 2010/0060664 | A1* | 3/2010 | Kilpatrick et al. ............ 345/650 |
| 2010/0117975 | A1* | 5/2010 | Cho .............. 345/173 |
| 2010/0164888 | A1* | 7/2010 | Okumura et al. ............. 345/173 |
| 2010/0182265 | A1* | 7/2010 | Kim et al. ..................... 345/173 |

FOREIGN PATENT DOCUMENTS

| EP | 2 333 761 | 6/2011 |
| KR | 1020110053269 | 5/2011 |
| WO | WO 2010/028399 | 3/2010 |

* cited by examiner

*Primary Examiner* — Maurice L McDowell, Jr.
(74) *Attorney, Agent, or Firm* — The Farrell Law Firm, P.C.

(57) ABSTRACT

An apparatus for changing a user interface of a portable terminal, by which a user interface and an operating system are automatically changed according to folding of a folding display unit of the portable terminal, and a method for changing a user interface of a portable terminal. The apparatus includes a folding display unit and a controller for performing a control operation for changing a user interface according to a screen size of the display unit, the screen size of the display unit being varied through folding of the display unit.

13 Claims, 4 Drawing Sheets

APPARATUS AND METHOD FOR CHANGING USER INTERFACE OF PORTABLE TERMINAL

PRIORITY

This application claims priority under 35 U.S.C. §119(a) to an application filed in the Korean Intellectual Property Office on Aug. 30, 2011 and assigned Ser. No. 10-2011-0087318, the entire disclosure of which is incorporated herein by reference.

BACKGROUND OF THE INVENTION

1. Field of the Invention

The present invention relates generally to an apparatus and a method for changing a user interface of a portable terminal, and more particularly to an apparatus for changing a user interface of a portable terminal, by which a user interface and an operating system are automatically changed according to folding of a folding display unit of the portable terminal, and a method for changing a user interface of a portable terminal.

2. Description of the Related Art

Portable terminals, which are widely used based on their mobility, support various functionality such as MP3 functionality corresponding to a file playback function, an image collecting functionality corresponding to a digital camera which can collect images, and gaming functionality for mobile games, such as arcade games, and the like.

The portable terminal requires a display unit for supporting such various functions, but having a display unit of a predetermined size or larger hinders its portability and is difficult to manufacture due to the spatial limitations imposed by the arrangement of other devices in manufacturing of the portable terminal.

However, with the development of display units overcoming the portability and spatial limitations of the portable terminal, portable terminals having a folding display unit have been proposed.

Therefore, there is a need to provide a user interface suited to a folding display unit of a portable terminal having a folding display as mentioned above.

SUMMARY OF THE INVENTION

Accordingly, the present invention has been made to solve the above-stated problems occurring in the prior art, and the present invention provides an apparatus and a method for changing a user interface of a portable terminal, by which a user interface and an operating system are automatically changed according to folding of a folding display unit of the portable terminal.

According to an aspect of the present invention, there is provided an apparatus for changing a user interface of a portable terminal, including a folding display unit; and a controller for performing a control operation for changing a user interface according to a screen size of the display unit, the screen size of the display unit being varied through folding of the display unit.

According to another aspect of the present invention, there is provided a method for changing a user interface of a portable terminal, by determining whether a folding display unit of the portable terminal is folded; and changing, when a folding of the folding display unit is detected, a user interface according to a screen size of the display unit which is varied through the folding of the display unit.

BRIEF DESCRIPTION OF THE DRAWINGS

The above and other aspects, features and advantages of various embodiments of the present invention will be more apparent from the following detailed description taken in conjunction with the accompanying drawings, in which.

DETAILED DESCRIPTION OF EMBODIMENTS OF THE PRESENT INVENTION

Figure 1:
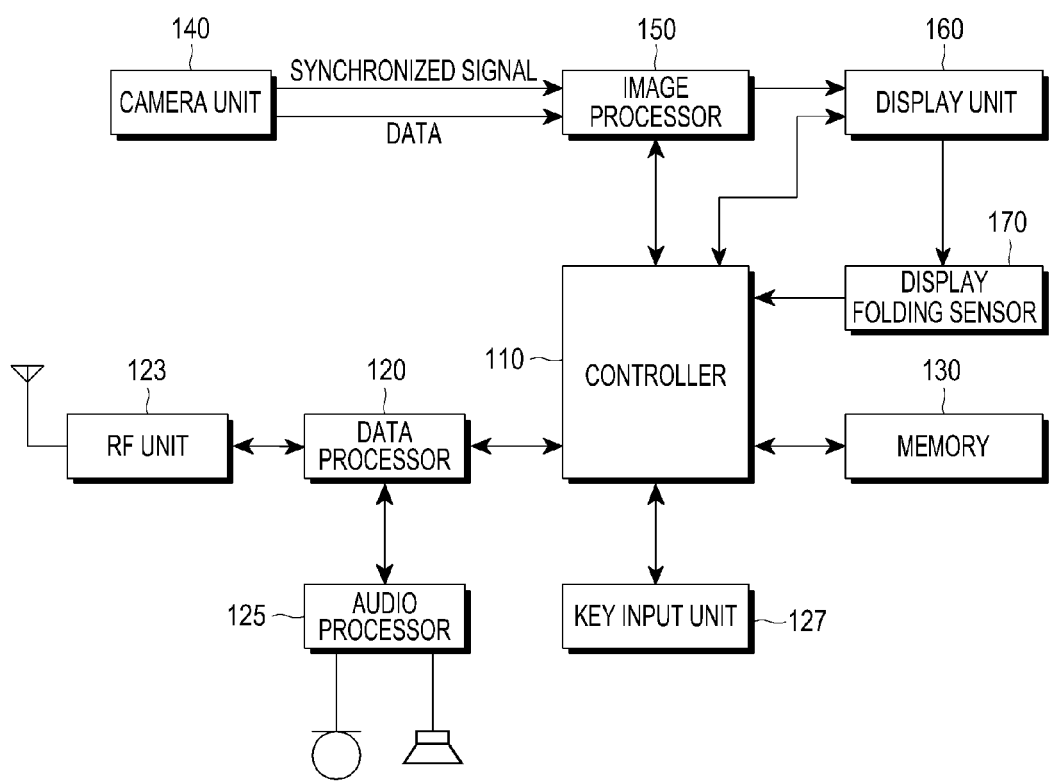
FIG. 1 is a block diagram illustrating a portable terminal according to an embodiment of the present invention.

Hereinafter, embodiments of the present invention will be described with reference to the accompanying drawings. It should be noted that the same or like reference numerals denote the same or like elements in the drawings.

FIG. 1 is a block diagram illustrating a portable terminal according to an embodiment of the present invention Referring to FIG. 1, a Radio Frequency (RF) unit 123 performs a wireless communication function of the portable terminal. The RF unit 123 includes an RF transmitter which up-converts and amplifies a frequency of a transmitted signal, and an RF receiver which low-noise amplifies a received signal and down-converts a frequency of the received signal. A data processor 120 includes a transmitter which codes and modulates the transmitted signal and a receiver which demodulates and decodes the received signal. That is, the data processor 120 may include a modem and codecs, where the codecs include a data codec which processes packet data, and the like and an audio codec which processes an audio signal such as a voice signal. An audio processor 125 plays back a received audio signal output from the audio codec of the data processor 120 or transfers a transmitted audio signal generated by a microphone to the audio codec of the data processor 120.

A key input unit 127 includes keys for inputting information on numbers and letters and functional keys for setting various functions.

A memory 130 includes a programmable memory and data memories. The programmable memory may store programs for controlling general operations of the portable terminal and programs for performing a control operation for changing a user interface according to a screen size of a display unit, which is varied through folding of the display unit, according to the embodiment of the present invention. The data memories perform a function of temporarily storing data generated while the programs are performed.

In addition, according to the embodiment of the present invention, the memory 130 stores user interfaces and operating systems corresponding to screen sizes of a folding display unit 160.

A controller 110 controls overall operations of the portable terminal.

According to the embodiment of the present invention, the controller 110 performs a control operation for changing a user interface and an operating system according to a screen size of the display unit 160, which is changed through a folding state of the folding display unit 160.

When receiving at least one piece of position information on a folding position of the display unit 160 from a display folding sensor 170, the controller 110 determines the first screen of the display unit, which is unfolded, and at least one second screen of the display unit, which is folded, in the display unit 160 through the received position information.

The controller 110 calculates a size of the first screen of the display unit 160, which is unfolded, through a resolution, extracts a user interface and an operating system corresponding to the size of the first screen from the memory 130, and performs a control operation for changing to the extracted user interface and operating system.

The controller 110 performs a control operation for turning on the first screen of the display unit 160, which is unfolded, and turning off the at least one second screen of the display unit 160, which is folded, so that information is displayed only on the first screen.

When the second screen of the display unit 160, which is folded, is selected for input, the controller 110 performs a control operation for turning on a touch screen panel of the second screen to switch the second screen to act as a separate input unit.

When the second screen of the display unit 160, which is folded, is selected for displaying, the controller 110 performs a control operation for turning on the second screen to switch the second screen to act as a separate display.

The controller 110 determines an upper part of the display unit 160 viewed by a user as the first screen, which is unfolded and a lower part of the display unit 160 as the second screen, which is folded, through an accelerometer sensor installed in the display unit 160.

The display folding sensor 170 senses at least one folding which occurs in the display unit 160. The display folding sensor 170 can sense at least one folding which occurs in the display unit 160 through an electrical stimulation of a backplane located at a folding portion in the display unit 160.

The display folding sensor 170 can sense at least one folding which occurs in the display unit 160 through a plurality of sensors installed in the display unit 160.

A camera unit 140, which takes photographs to generate image data, includes a camera sensor which converts a photographed optical signal into an electrical signal, and a signal processor which converts an analog image signal into digital data. In this case, it is assumed that the camera sensor is a Charge-Coupled Device (CCD) or a Complementary Metal—Oxide—Semiconductor CMOS sensor, and the signal processor may be implemented with a digital signal processor. The camera sensor and the signal processor may be implemented integrally or separately.

The image processor 150 performs Image Signal Processing (ISP) for displaying an image signal output from the camera unit 140 on the display unit 160. The ISP performs functions, such as gamma correction, interpolation, spatial variation, image effect, image scale, AWB, AE, AF, etc. Thus, the image processor 150 processes an image signal output from the camera unit 140 in units of frames, and outputs the image frame data suited to the feature and size of the display unit 160. The image processor 150 has a video codec, and performs functions of compressing an image frame data to be displayed on the display unit 160 in a preset manner or decompressing a compressed image frame data to be restored to an original image frame data. The video codec may be a JPEG codec, an MPEG4 codec, a Wavelet codec, etc. It is assumed that the image processor 150 has an On-Screen Display (OSD) function, and the image processor 150 may output on-screen display data corresponding to a screen size which will be displayed under the control of the controller 110.

Since the display unit 160 is a folding display, a folding portion of the display unit 160 is not fixed.

The display unit 160 displays an image signal output from the image processor 150 on a screen, and displays user data output from the controller 110. The display unit 160 may be a Liquid Crystal Display (LCD) and may include an LCD controller, a memory for storing image data, and an LCD display device. When the LCD is implemented as a touch screen, the display unit 160 may serve as an input unit, and the display unit 160 may display keys such as a key input unit 127.

An operation of changing a user interface and an operating system according to a folded state of the display unit in the above-mentioned portable terminal will be described in detail with reference to FIGS. 2 to 4.

Figure 2:
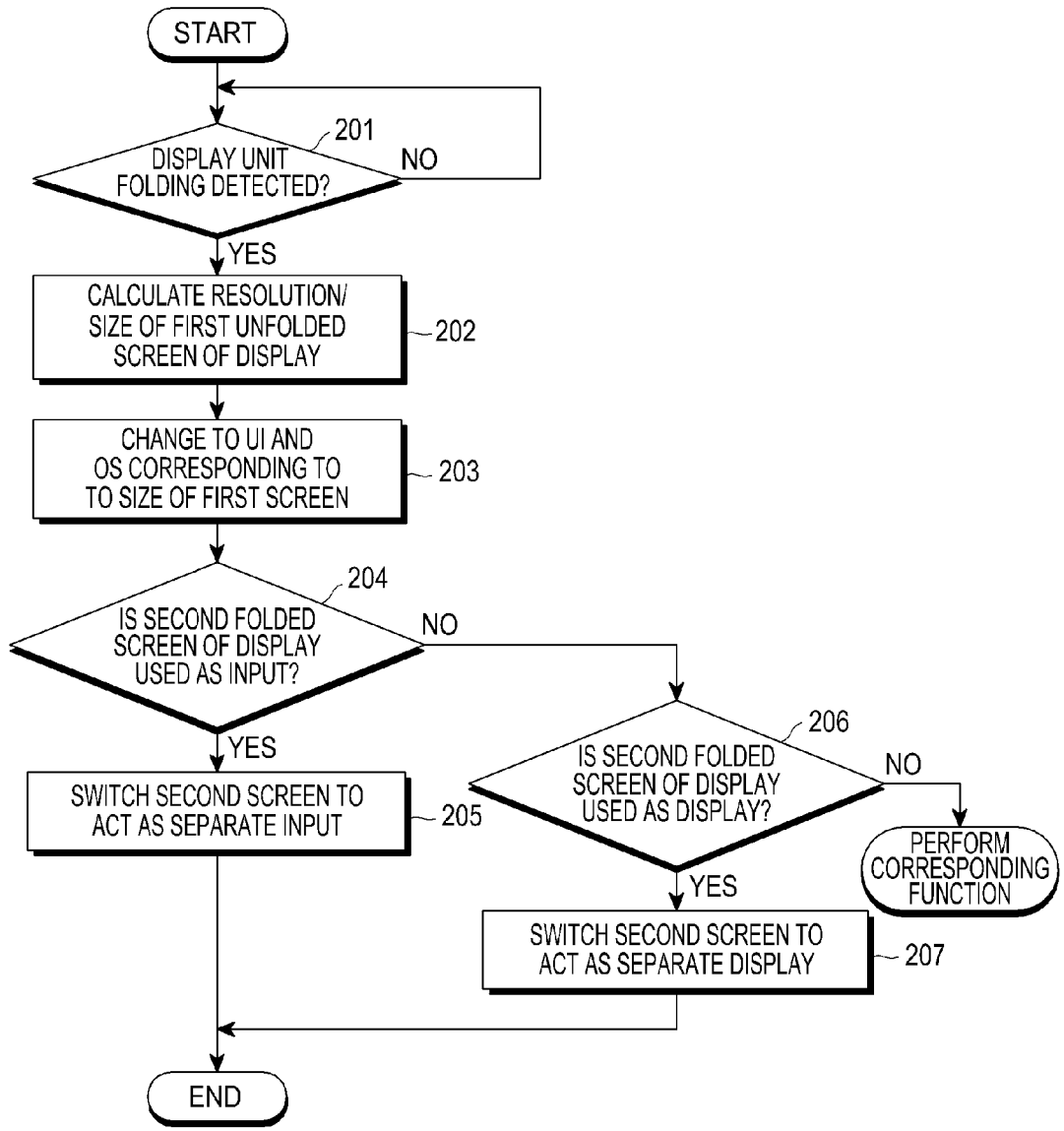
FIG. 2 is a flowchart illustrating a procedure of changing a user interface and an operating system in a portable terminal according to an embodiment of the present invention.

FIG. 2 is a flowchart illustrating a procedure of changing a user interface and an operating system in a portable terminal according to an embodiment of the present invention. FIGS. 3 and 4 are diagrams illustrating a procedure of changing a user interface and an operating system in a portable terminal according to the embodiment of the present invention.

Referring to FIG. 2, in step 201, when the folding display unit 160 of the portable terminal is folded, the display folding sensor 170 senses the folding of the display unit 160 through an electrical stimulation of a backplane located at a folding portion of the display unit 160 and transfers location information on the folding portion of the display unit 160 to the controller 110. Since the display unit 160 may be folded several times, a plurality of location information elements may be transferred from the display folding sensor 170 to the controller 100.

The controller 110 senses the folding of the display unit 160 based on at least one location information element received from the display folding sensor 170, and determines a first screen which is unfolded and at least one second screen which is folded.

Then, the controller 110 determines an upper part of the display unit 160 as the first screen and a lower part of the display unit 160 as the second screen through an accelerometer sensor installed in the display unit 160.

Then, the controller 110 turns on the first screen of the display unit 160, which is unfolded, and turns off the second screen of the display unit 160, which is folded.

The controller 110 proceeds to step 202 where a resolution of the first screen of the display unit 160 is detected and a size of the first screen is calculated. The controller 110 extracts a user interface and an operating system corresponding to the calculated size of the first screen from the memory 130, and proceeds to step 203 where the current user interface and operating system of the portable terminal are changed to the extracted user interface and operating system.

Then, when the second screen folded in the display unit 160 is selected for input, the controller 110 senses this fact in step 204 and proceeds to step 205 where the controller 110 turns on a touch screen panel of the second screen to switch the second screen to act as a separate input unit.

When the second screen of the display unit 160, which is folded, is selected for displaying, the controller 110 senses this fact in step 206 and proceeds to step 207 where the controller 110 turns on the second screen to switch the second screen to act as a separate display. Thus, the first and second screens are both turned on, such that the first and second screens may be used as a mirror or in a multi-functional mode.

Figure 3A:
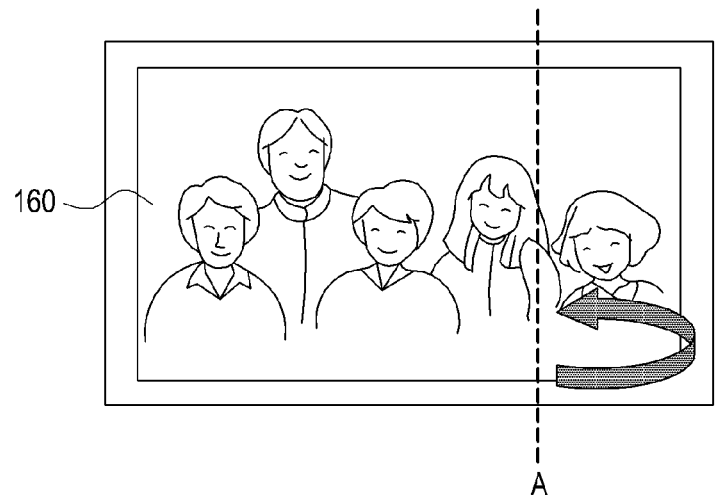
FIGS. 3A, 3B, 3C, and 4 are diagrams illustrating a procedure of changing a user interface and an operating system in a portable terminal according to an embodiment of the present invention.

Referring to FIG. 3A, in the procedure of FIG. 2, the size of the unfolded display unit is a first size, for example, 10 inches.

Figure 3B:
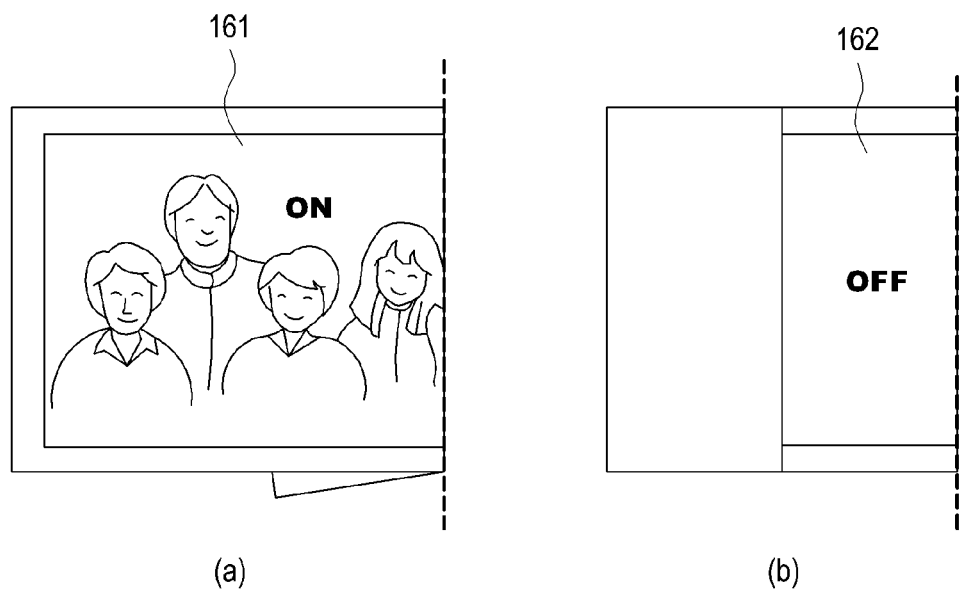

FIG. 3B illustrates that a portion of the display unit 160 of FIG. 3A is folded, where the size of the display unit is a second size, for example, 7 inches.

Figure 3C:
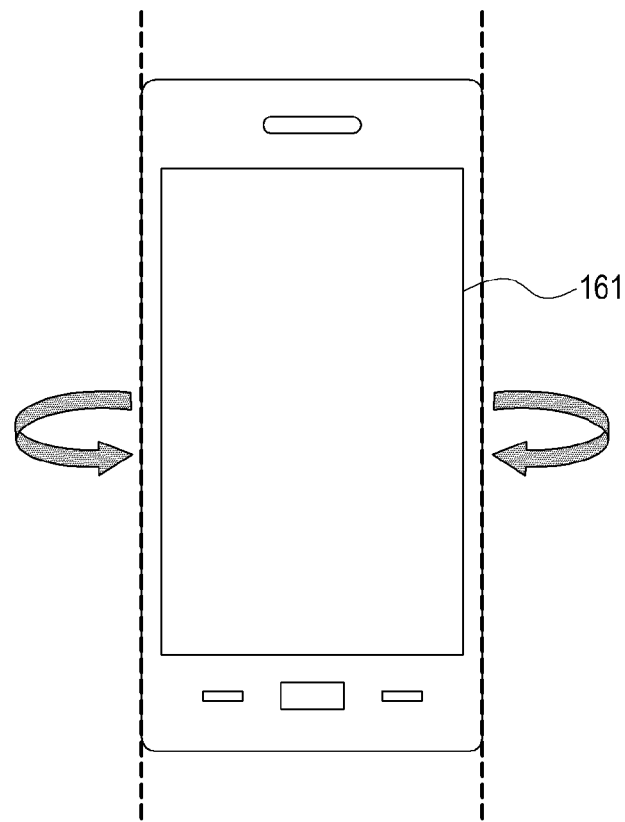

FIG. 3C illustrates that a portion of the display unit 160 of FIG. 3B is further folded, where the size of the display unit is a third size, for example, 5 inches.

When the display unit 160 is folded along a dotted line "A", the first screen 161, which is unfolded as illustrated in (a) in FIG. 3B, is turned on, and the second screen 162, which is folded as illustrated in (b) in FIG. 3B, is turned off. In FIG. 3B (a) illustrates an upper part of the display unit 160 and (b) illustrates a lower part of the display unit 160.

The upper part of the display unit is the screen viewed by a user, i.e., the unit displays data when the screen turns on, and the lower part of the display unit is the screen which is not viewed by a user, i.e., the unit which is not displaying the data when the screen turns off.

As illustrated in FIG. 3B, when the display unit 160 is folded, the size and resolution of the first screen are calculated. After obtaining the calculation result, a resolution of 200 DPI corresponding to the second size of 7 inches is extracted, and the user interface and operating system corresponding to the second size of 7 inches and the 200 DPI resolution are extracted from the memory and the user interface and operating system of the display unit 160 are changed to the extracted user interface and operating system.

When the display unit 160 depicted in FIG. 3B is further folded as shown in FIG. 3C, only the first screen 161 of the display unit 160 which is unfolded is turned on. Then, the size and resolution of the first screen 161 are calculated, and when a resolution of 250 DPI corresponding to the third size of 5 inches is extracted from the memory as the calculation result, the user interface and operating system appropriate for a "5 inches and 250 DPI" display are extracted to replace the current user interface and operating system.

In the embodiment of the present invention, although the resolutions of 200 DPI and 250 DPI corresponding to 7 inches and 5 inches have been described, the resolution to a size relationship may be more varied.

Figure 4:
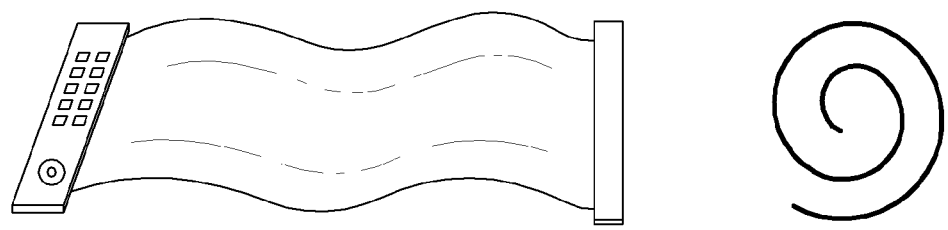

As illustrated in FIG. 4, the display unit of the portable terminal is folding, and even when the display unit is rolled up, the sizes of rolled and unrolled areas are recognized through a procedure illustrated in FIG. 2, such that the user interface and operating system of the portable terminal can be changed.

FIGS. 2 to 4 illustrate a procedure of recognizing a folding location of the display unit folded by a user and changing the user interface and operating system according to a screen size of the display unit with the folding portion of the display unit not being fixed according to an embodiment of the present invention.

When the folding of the display unit is set in advance, the screen size of the display unit may be extracted according to the preset number of folding portions and the user interface and operating system may be changed according to the screen size of the display unit. For example, when the display is sensed to be folded once, the screen size may be recognized as the second size of 7 inches, and when it is sensed to be folded twice, the screen size may be recognized as the third size of 5 inches.

Accordingly, the present invention provides an apparatus for changing a user interface of a portable terminal, by which a user interface and an operating system are automatically changed to correspond to a screen size of a display unit of the portable terminal, and a method for changing a user interface of a portable terminal.

While the invention has been shown and described with reference to various embodiments thereof, such as a portable terminal, it will be understood by those skilled in the art that various changes in form and detail may be made therein without departing from the spirit and scope of the invention as defined by the appended claims.

What is claimed is:

1. A portable terminal comprising:
   a foldable display unit configured to display a screen and recognize touch input of a user; and
   a controller configured to display the screen in a first area of the foldable display unit and recognize the touch input associated with a user interface of the first area in a second area of the foldable display unit which is not displaying the screen, when the foldable display unit is folded.

2. The portable terminal as claimed in claim 1, further comprising:
   a display folding sensor for sensing a folding of the foldable display unit; and
   a memory for storing user interface information and operating system information corresponding to area sizes of the foldable display unit.

3. The portable terminal as claimed in claim 2, wherein the display folding sensor senses the folding of the foldable display unit which occurs in the foldable display unit through an electrical recognition of a backplane located at a folding portion in the foldable display unit.

4. The portable terminal as claimed in claim 1, wherein the controller calculates a size of the first area, which is unfolded, based on a resolution of the first area as the foldable display unit is folded, and performs a control operation for changing a user interface and an operating system appropriate for the size of the first area.

5. The portable terminal as claimed in claim 1, wherein the controller performs a control operation for turning on the first area, which is unfolded, and turning off the second area which is folded.

6. The portable terminal as claimed in claim 1, wherein when the second area which is folded is selected to be used for input, the controller performs a control operation for switching the second area to act as a separate input unit.

7. The portable terminal as claimed in claim 1, wherein when the second area which is folded is selected for displaying, the controller performs a control operation for turning on the second area and switching the second area to act as a separate display.

8. A method for changing a user interface of a portable terminal, the method comprising:
   displaying a screen and recognizing touch input of user in a foldable display unit; and
   displaying the screen in a first area of the foldable display unit and recognizing the touch input associated with user interface of the first area in a second area of the foldable display unit which is not displaying the screen, when the foldable display unit is folded.

9. The method as claimed in claim 8, wherein changing the user interface comprises:
   calculating a size of the first area, which is unfolded, through a resolution of the first area when the folding of the foldable display unit is detected;
   extracting user interface information and operating system information corresponding to the size of the first area; and
   changing the user interface according to the extracted user interface information and operating system information.

10. The method as claimed in claim 8, wherein folding of the foldable display unit is detected through an electrical recognition of a backplane located at a folding portion in the foldable display unit.

11. The method as claimed in claim 8, further comprising turning on the first area, which is unfolded, and turning off the second area, which is folded, when a folding of the folding foldable display unit is detected.

12. The method as claimed in claim 11, further comprising switching the second area to act as a separate input unit when the second area, which is folded, is selected for input.

13. The method as claimed in claim 11, further comprising turning on the second area to switch the second area to act as a separate display when a second area, which is folded, is selected for displaying.

* * * * *